(12) United States Patent
Qin et al.

(10) Patent No.: US 9,514,694 B2
(45) Date of Patent: Dec. 6, 2016

(54) ARRAY SUBSTRATE, METHOD FOR DRIVING THE SAME, FLEXIBLE DISPLAY DEVICE AND ELECTRONIC EQUIPMENT

(71) Applicant: BOE TECHNOLOGY GROUP CO., LTD., Beijing (CN)

(72) Inventors: Wei Qin, Beijing (CN); Weifeng Zhou, Beijing (CN); Jing Su, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 85 days.

(21) Appl. No.: 14/407,000

(22) PCT Filed: Apr. 24, 2014

(86) PCT No.: PCT/CN2014/076080
§ 371 (c)(1),
(2) Date: Dec. 10, 2014

(87) PCT Pub. No.: WO2015/032210
PCT Pub. Date: Mar. 12, 2015

(65) Prior Publication Data
US 2016/0035298 A1 Feb. 4, 2016

(30) Foreign Application Priority Data

Sep. 4, 2013 (CN) .......................... 2013 1 0397925

(51) Int. Cl.
*G09G 3/36* (2006.01)
*G09G 3/20* (2006.01)
*G02F 1/1362* (2006.01)

(52) U.S. Cl.
CPC ....... *G09G 3/3648* (2013.01); *G02F 1/136286* (2013.01); *G09G 3/20* (2013.01);
(Continued)

(58) Field of Classification Search
CPC G09G 3/3648; G09G 3/3688; G09G 2300/08; G09G 2300/0426; G09G 2380/02
See application file for complete search history.

(56) References Cited

U.S. PATENT DOCUMENTS

2008/0018583 A1* 1/2008 Knapp .................. G02F 1/1333
345/99
2009/0102758 A1* 4/2009 Anzai .................. G09G 3/3225
345/76

FOREIGN PATENT DOCUMENTS

| CN | 1302328 A | 7/2001 |
|---|---|---|
| CN | 1659614 A | 8/2005 |

(Continued)

OTHER PUBLICATIONS

Chinese Office Action mailed Jun. 4, 2015 regarding Chinese Application No. 201310397925X. Translation provided by Dragon Intellectual Property Law Firm.

(Continued)

*Primary Examiner* — Sahlu Okebato
(74) *Attorney, Agent, or Firm* — Harness, Dickey & Pierce, P.L.C.

(57) ABSTRACT

The present disclosure provides an array substrate, which includes a flexible substrate and an array layer formed on the flexible substrate. The array layer includes: data lines, gate lines, thin film transistors and a driving unit. The driving unit is configured to output data driving signals to connected data lines. The data lines includes a first data line connected to thin film transistors of a first number and a second data line connected to thin film transistors of a second number. The number of sub-signals in a data driving signal outputted to the first data line by the driving unit within a time period of one frame is the first number. The number of sub-signals in a data driving signal outputted to the second data line by the
(Continued)

driving unit within a time period of one frame is the second number.

18 Claims, 6 Drawing Sheets

(52) U.S. Cl.
CPC ... *G09G 3/3688* (2013.01); *G09G 2300/0426* (2013.01); *G09G 2300/08* (2013.01); *G09G 2380/02* (2013.01)

(56) References Cited

FOREIGN PATENT DOCUMENTS

| | | | |
|---|---|---|---|
| CN | 1961251 | A | 5/2007 |
| CN | 101536064 | A | 9/2009 |
| CN | 101779227 | A | 7/2010 |
| CN | 102156360 | A | 8/2011 |
| CN | 202583659 | U | 12/2012 |
| CN | 102902116 | A | 1/2013 |
| CN | 103454821 | A | 12/2013 |
| CN | 103454822 | A | 12/2013 |
| CN | 203519983 | U | 4/2014 |
| JP | 2009069768 | A | 4/2009 |

OTHER PUBLICATIONS

International Search Report and Written Opinion mailed Aug. 4, 2014 regarding PCT/CN2014/076080 . Translation provided by Dragon Intellectual Property Law Firm.

\* cited by examiner inflexible region    flexible region

ARRAY SUBSTRATE, METHOD FOR DRIVING THE SAME, FLEXIBLE DISPLAY DEVICE AND ELECTRONIC EQUIPMENT

CROSS-REFERENCE TO RELATED APPLICATION

This application is the U.S. national phase of PCT Application No. PCT/CN2014/076080 filed on Apr. 24, 2014, which claims the priority to Chinese Patent Application No. 201310397925.X filed with the Chinese Patent Office on Sep. 4, 2013, which is incorporated herein by reference in its entirety.

TECHNICAL FIELD

The present disclosure relates to a flexible display technology, in particular to an array substrate, a method for driving the same, a flexible display device and an electronic equipment.

BACKGROUND

A flexible display refers to a kind of a display technology or a display device which may be manufactured to be super-thin, super-large and flexible, by using a flexible substrate. The main features of the flexible display may be described with three words: thin, light, and flexible.

A flexible substrate in the related art is generally divided into two regions: one is an inflexible region while the other is a flexible region. FIG. 1 is a schematic diagram showing a structure of a flexible array substrate in the related art. As shown in FIG. 1, on an array substrate 1, a position where a driving unit 4 is provided is in the flexible region, the driving unit 4 is connected to a data line 2 and a gate line 3 to drive a thin film transistor (TFT) 5 provided on the panel; other region is the flexible region.

As shown in FIG. 1, the data line 2 and the gate line 3 are provided in a manner of being perpendicular to a side of the flexible substrate. Therefore, in this case, the numbers of the TFTs correspondingly connected to each of the data lines are exactly the same. FIG. 2 is a schematic diagram showing data driving signals for a flexible array substrate in the related art. As shown in FIG. 2, the driving signals corresponding to each of the data lines include sub-signals (i.e., pulses in FIG. 2) of a same number.

However, this manner is only suited for the case in which numbers of the TFTs correspondingly connected to the respective data lines are same, and therefore does not have flexibility.

SUMMARY

One object of one embodiment of the present disclosure is to provide an array substrate, a method for driving the same, a flexible display device and, an electronic equipment, to improve the flexibility of driving the array substrate.

In order to achieve the above object, one embodiment of the present disclosure provides an array substrate, including a flexible substrate and an array layer formed on the flexible substrate, wherein the array layer includes:

a plurality of data lines and a plurality of gate lines, intersected with each other on the flexible substrate to form a plurality of sub-pixel regions;

thin film transistors, provided in the sub-pixel regions and connected to corresponding data lines and corresponding gate lines;

the array substrate further includes:

a driving unit, configured to output data driving signals to connected data lines;

wherein the plurality of data lines include a first data line connected to thin film transistors of a first number and a second data line connected to thin film transistors of a second number; the number of sub-signals in a data driving signal outputted to the first data line by the driving unit within a time period of one frame is the first number; the number of sub-signals in a data driving signal outputted to the second data line by the driving unit within a time period of one frame is the second number.

Alternatively, the data lines are arranged in parallel, and an angle between any one of the data lines and any side of the flexible substrate is not equal to 90°.

Alternatively, the gate lines and the data lines are perpendicular to each other.

Alternatively, an angle between the data lines and one side of the flexible substrate is in a range of 30° to 60°.

Alternatively, the angle between the data lines and one side of the flexible substrate is 45°.

Alternatively, in an arrangement direction of the data lines, the data lines are divided into two portions;

in the arrangement direction of the data lines, among the data lines in one portion, the number of thin film transistors connected to one preceding data line is less than the number of thin film transistors connected to one following data line; among the data lines in other one portion, the number of thin film transistors connected to one preceding data line is less than the number of thin film transistors connected to one following data line.

Alternatively, among the data lines in the one portion, the numbers of transistors connected to the data lines are increased with a first common difference; among the data lines in the other one portion, the numbers of transistors connected to the data lines are decreased with a second common difference. Optionally, the first common difference is equal to the second common difference.

Alternatively, the flexible substrate is divided into a flexible display region and an inflexible peripheral region, the driving unit being provided in the peripheral region.

Alternatively, the driving unit includes a first driving unit and a second driving unit provided correspondingly on two opposite sides of the flexible substrate; the first driving unit and the second driving unit are and connected to the data lines and the gate lines based on a principle of connection to the nearest.

Alternatively, each of the first driving unit and the second driving unit may include a data driving unit configured to separately drive the data lines and a gate driving unit configured to separately drive gate lines.

In order to better achieve the above object, one embodiment of the present disclosure also provides a flexible display device, including any of the above array substrate.

In order to better achieve the above objective, one embodiment of the present disclosure also provides an electronic equipment, including the above-described flexible display device.

In order to better achieve the above objective, an embodiment of the present disclosure also provides a method for driving the above-described array substrates, used for the driving unit, the driving method including:

generating, by the driving unit, a data driving signal corresponding to a first data line;

outputting, by the driving unit, the data driving signal to the first data line;

wherein the number of sub-signals in the data driving signal outputted to the first data line by the driving unit within a time period of one frame is equal to the number of thin film transistors connected to the first data line.

In the above-described driving method, in an arrangement direction of the data lines, the data lines are divided into a first portion and a second portion; in the arrangement direction of the data lines, among the data lines in the first portion, the number of thin film transistors connected to one preceding data line is less than the number of thin film transistors connected to one following data line; and among the data lines in the second portion, the number of thin film transistors connected to one preceding data line is less than the number of thin film transistors connected to one following data line; the data driving signals are divided into two portions; in the driving signals corresponding to the data lines in the first portion, the number of sub-signals in one driving signal corresponding to one preceding data line is less than the number of sub-signals in one driving signal corresponding to one following data line; and in the driving signals corresponding to the data lines in the second portion, the number of sub-signals in one driving signal corresponding to one preceding data line is larger than the number of sub-signals in one driving signal corresponding to one following data line.

One embodiment of the present disclosure has at least the following advantageous effects.

In one embodiment of the present disclosure, the driving unit determines the numbers of sub-signals in the data driving signals according to the numbers of thin film transistors connected to the data lines, which may meet driving requirements of the array substrate having different data lines connected with different numbers of the thin film transistors and have better flexibility.

DETAILED DESCRIPTION

In an array substrate, a method for driving the same, a flexible display device and an electronic equipment according to one embodiment of the present disclosure, a driving unit determines the number of sub-signals in a data driving signal according to the number of thin film transistors connected to the data line, which may meet driving requirements of the array substrate having different data lines connected with different numbers of the thin film transistors and have better flexibility.

It should be understood that, in one embodiment of the present disclosure, the "first" and "second" represent to be not equal when they are used to compare numbers, and to be relative but not specific when they are used to represent a positional relationship. For example, a first number is not equal to a second number. For example, a data line A may be referred to a first data line, while the other data line B may be referred to a second data line; relatively speaking, the data line B may also be referred to a first data line, while the data line A may be referred to a second data line. Further, a first data line (or a first gate line) may refer to one data line (or one gate line) in a plurality of data lines (or gate lines), or refer to a data line (or a gate line) with substantially same functions, such as having same characteristics (for example, being connected to thin film transistors of the same number, or being of the same length), in a plurality of data lines (or gate lines).

Figure 1:
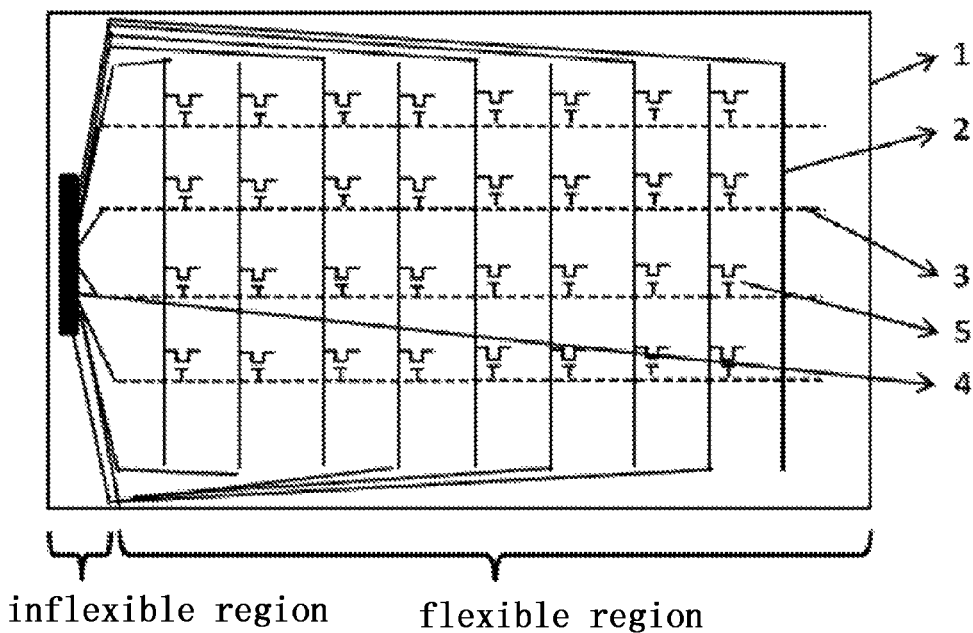
FIG. 1 is a schematic diagram showing a structure of a flexible array substrate in the related art.
Figure 2:
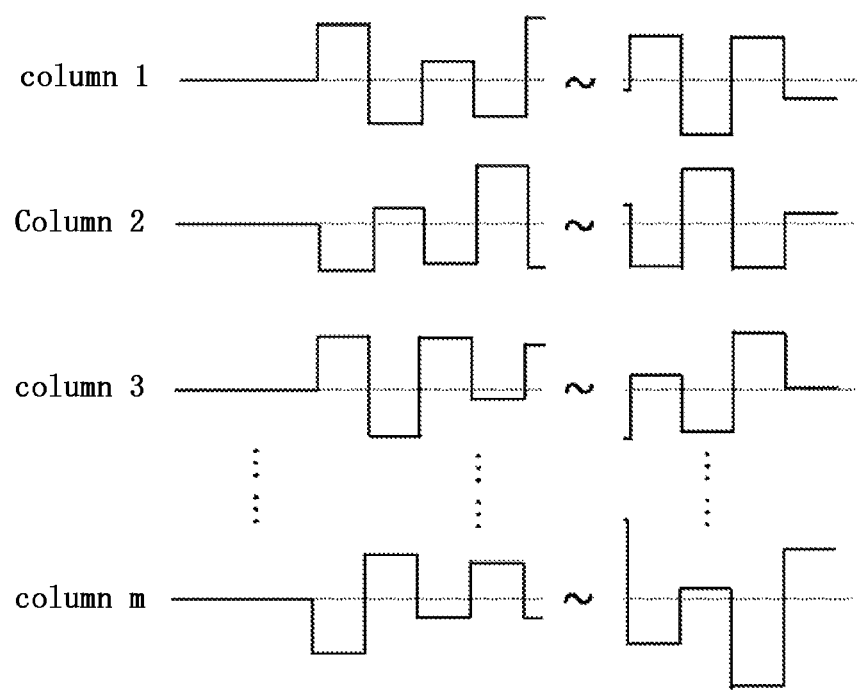
FIG. 2 is a schematic diagram showing data driving signals for a flexible array substrate in the related art.
Figure 3:
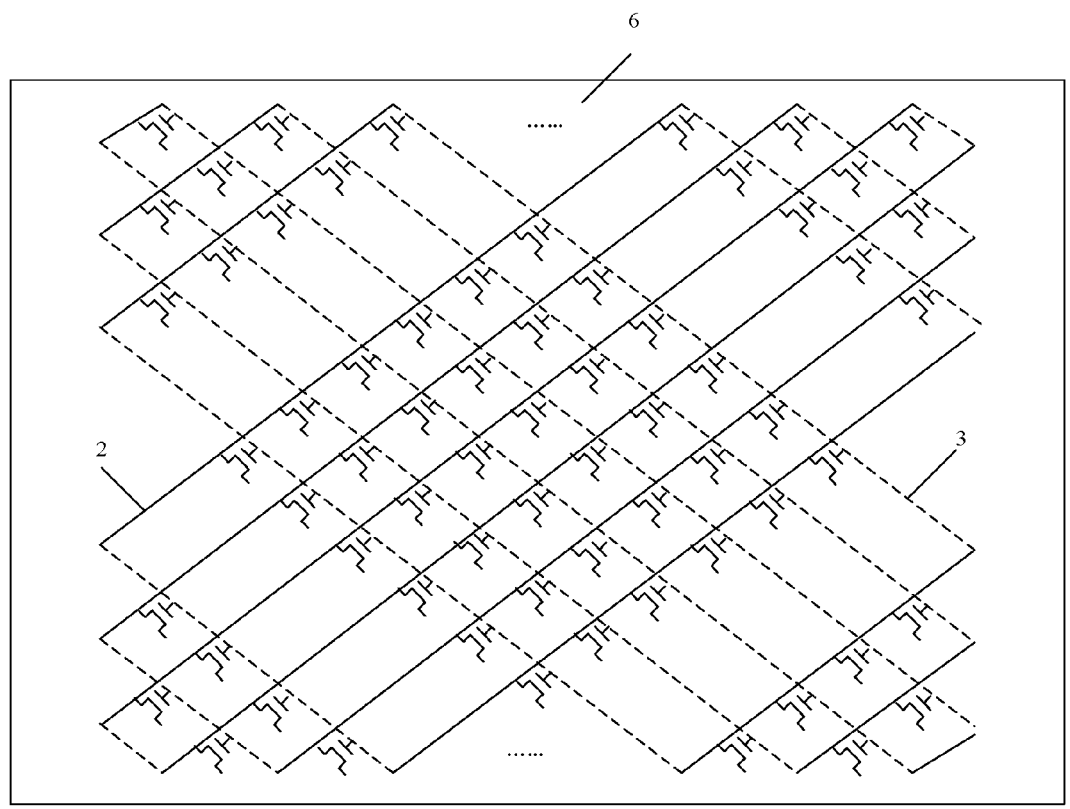
FIG. 3 is a schematic diagram showing a structure of a flexible array according to one embodiment of the present disclosure.

As shown in FIG. 3, one embodiment of the present disclosure provides an array substrate, including a flexible substrate 6 and an array layer formed on the flexible substrate. The array layer includes:

a plurality of data lines 2 and a plurality of gate lines 3, which are intersected with each other on the flexible substrate 6 to define a plurality of sub-pixel regions;

thin film transistors provided in the sub-pixel regions and connected to corresponding data lines 2 and corresponding gate lines 3.

The array substrate further includes:

a driving unit (not shown in the figures), configured to output data driving signals to connected data lines.

The plurality of data lines includes a first data line connected to thin film transistors of a first number and a second data line connected to thin film transistors of a second number. The number of sub-signals in a data driving signal outputted by the driving unit within a time period of one frame to the first data line is the first number; the number of sub-signals in a data driving signal outputted by the driving unit within a time period of one frame to the second data line is the second number.

It should be understood, in one embodiment of the present disclosure, the above-described driving unit is configured to output data driving signals to the connected data lines; however, it does not indicate that the driving unit is only configured to singly drive the data lines. The driving unit is also able to simultaneously drive data lines and gate lines, which will be described later in detail.

Here, it should be noted that the sub-signal refers to a signal inputted to a pixel electrode via a TFT by a driving unit.

The above sub-signal will be described with taking a case shown in FIG. 4 as an example. In the FIG. 4, a data line 41 at the top is connected with seven TFTs; while a data line 42 in the middle is connected with eight TFTs and a data line 43 at the bottom is connected with nine TFTs. At this time, in the array substrate according to one embodiment of the present disclosure, within a time period of one frame, the number of sub-signals in a data driving signal outputted by the driving unit to the data line 41 at the top is seven; the number of sub-signals in a data driving signal outputted by the driving unit to the data line 42 in the middle is eight; the number of sub-signals in a data driving signal outputted by the driving unit to the data line 43 at the bottom is nine.

The sub-signals will be further described hereinafter from the angle of the driving unit.

Figure 4:
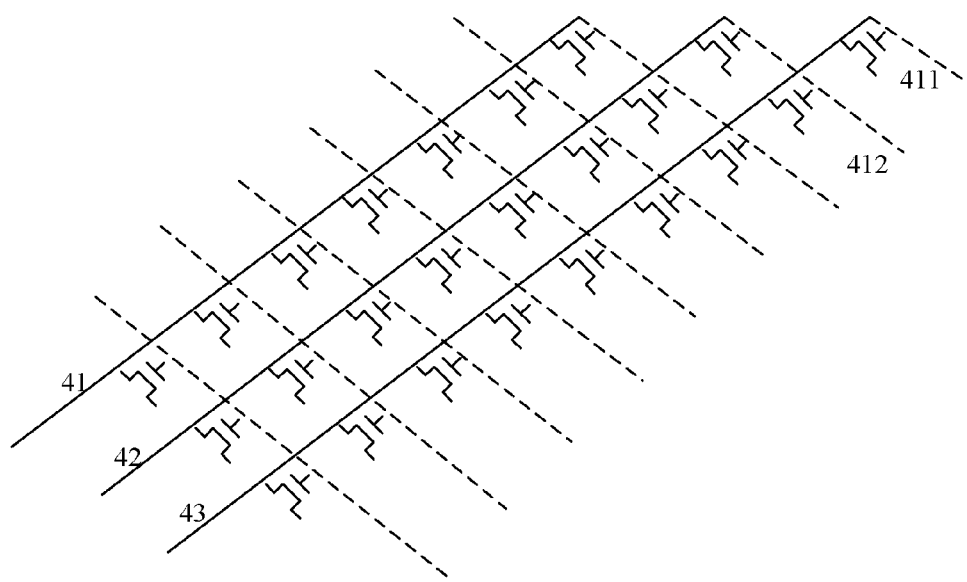
FIG. 4 is a schematic diagram showing that different numbers of thin film transistors are connected to different data lines on a flexible array substrate according to one embodiment of the present disclosure.

With taking the case shown in FIG. 4 as an example, the data line 41 at the top is connected with seven TFTs; while the data line 42 in the middle is connected with eight TFTs and the data line 43 at the bottom is connected with nine TFTs. A gate line 411 is connected with one TFT, a gate line 412 is connected with two TFTs, and a gate line 413 is connected with three TFTs. At this time, in the array substrate according to one embodiment of the present disclosure, the gate lines are progressively scanned. At time t1, the driving unit inputs a gate driving signal to the gate line 411, to open one thin film transistor; at this time, the driving unit input the data driving signal to the data line 43, the number of sub-signals outputted by the driving unit is one. Similarly, at time t2, the number of sub-signals of a gate driving signal inputted to gate line 412 by the driving unit is two; and at this time, the data driving signals are inputted to the data lines 42, 43, thus the number of sub-signals outputted by the driving unit is two, and so on.

In one embodiment of the present disclosure, the driving unit determines the number of sub-signals in a data driving signal according to the number of thin film transistors connected to the data line, which may meet driving requirements of the array substrate having different data lines connected with different numbers of the thin film transistors and have better flexibility compared to the related art.

In one embodiment of the present disclosure, different data lines connected with different numbers of thin film transistors is caused by different lengths of an array substrate in an arrangement direction of the data lines.

Figure 5A:
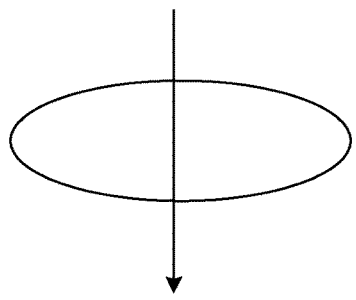
FIGS. 5a-5c are schematic diagrams showing why numbers of thin film transistors connected to different data lines are different.
Figure 5B:
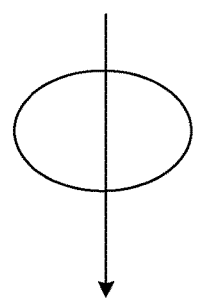
Figure 5C:
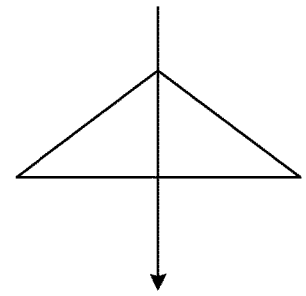

FIGS. 5a-5c are schematic diagrams showing that array substrates of different shapes cause different data lines to be connected with different numbers of thin film transistors. Directions shown by arrows on the array substrates of different shapes are extending directions of data lines, while arrangement directions of the data lines are directions perpendicular to the directions shown by the arrows, thereby resulting in that the numbers of TFTs corresponding to each of data line are different.

FIG. 3 and FIG. 4 are other situations.

As shown in FIG. 3 and FIG. 4, data lines are arranged in parallel. However, an angle between any data line and any side of the flexible substrate is not equal to 90°. Although the shape of the array substrate is regular, the data lines are arranged obliquely with respect to the flexible substrate, the lengths of data lines are different, thereby resulting that the numbers of thin film transistors connected to different data lines are different.

It should be understood that in one embodiment of the present disclosure, the structure relationships between thin film transistors and data lines and between thin film transistors and the gate lines are simplified. Generally, a gate electrode of a thin film transistor is connected to a gate line, a source (drain) electrode of the thin film transistor is connected to a data line, the drain (source) electrode of the thin film transistor is connected to a pixel electrode (not shown); since production processes of the drain and source electrodes of the thin film transistor are substantially the same, their names may be interchanged.

In one embodiment of the present disclosure, a specific arrangement of gate lines is not limited. However, in order to facilitate the manufacture and arrange more sub-pixels on the substrate, in one embodiment of the present disclosure, as shown in FIG. 3, the gate lines and the data lines are perpendicular to each other.

An ideal inclination angle of the data lines is an angle in a range of 30° to 60° defined between the data line and one side of the flexible substrate.

In one optional embodiment, the angle between the data line and one side of the flexible substrate is 45°.

In one embodiment of the present disclosure, the angle between the data line and one side of the flexible substrate is defined as follows.

The range of the angle between the data line and one side of the flexible substrate is defined to be in [0°, 90°], with taking data lines in the display region and the side of the flexible substrate equivalent to straight lines (or segments) as an example.

Figure 6A:
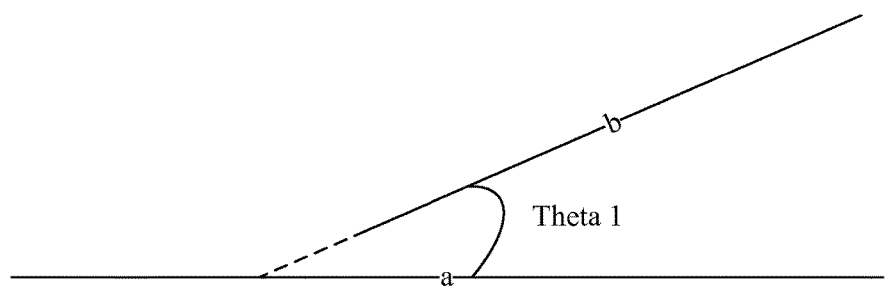
FIGS. 6a-6b are schematic diagrams showing a definition of an angle between a signal transmission line and a side of a flexible substrate.
Figure 6B:
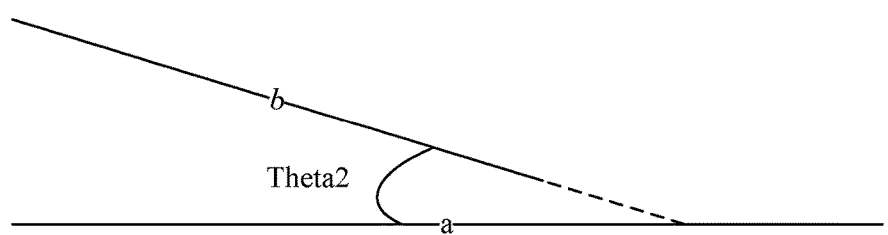

As shown in FIG. 6a, a is assumed as one side of the flexible substrate, then an angle between a signal transmission line b and the a is defined as Theta 1 in FIG. 6a. While in FIG. 6b, an angle between a signal transmission line b and a is defined as Theta 2 in FIG. 6b. When a is perpendicular to b, the angle between the a and the b is defined to be 90°, and when the a is parallel to or coincident with the b, the angle between the a and the b is defined to be 0°.

As shown in FIG. 3 and FIG. 4, the angles between all data lines 2/gate lines 3 and any side of the flexible substrate are not equal to 90°, that is, the angles Φ between any data line 2/gate line 3 and any side of the flexible substrate satisfies the following relationship: 0°<Φ<90°.

Of course, in consideration of that sufficient pixels are required for the flexible substrate, therefore, as shown in FIG. 3 and FIG. 4, the angle Φ between any data line 2/gate line 3 and one side of the flexible substrate is taken to be 45°.

Figure 7:
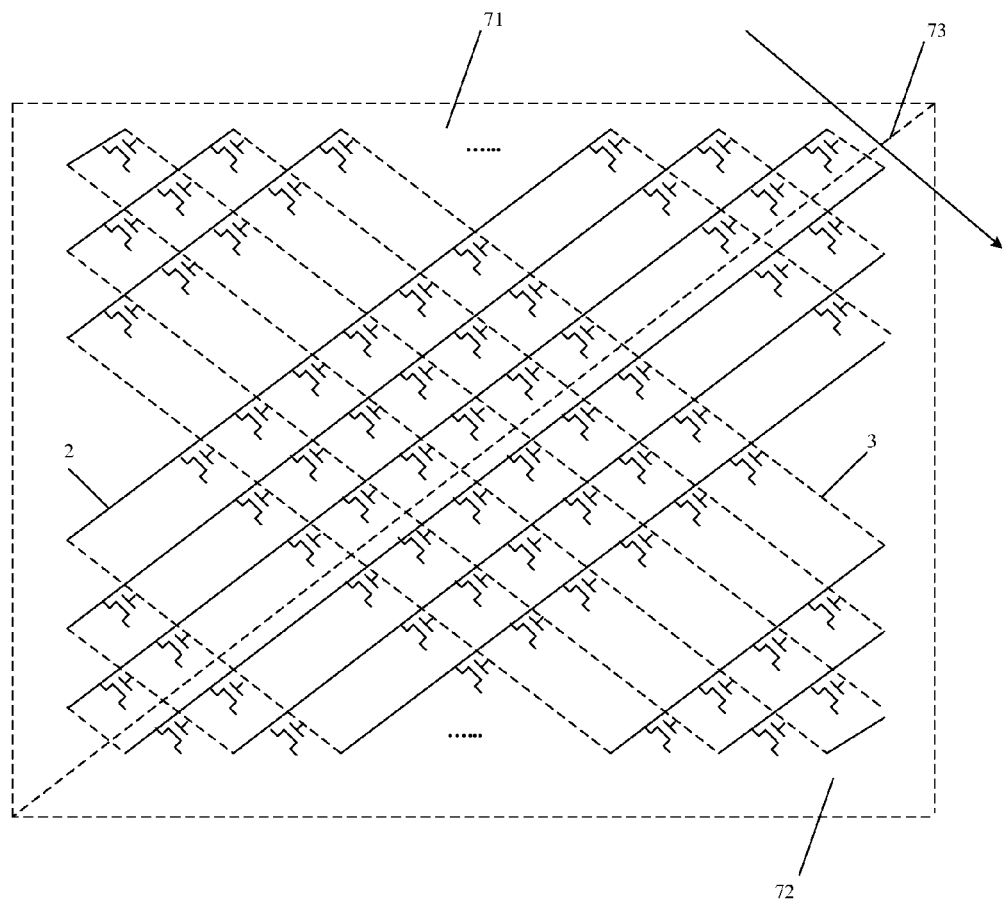
FIG. 7 is a schematic diagram showing that data lines on a flexible array substrate according to one embodiment of the present disclosure, where the data lines are divided into two portions.

As shown in FIG. 7, in one embodiment of the present disclosure, in the arrangement direction of the data lines, the data lines are divided into a first portion 71 and second portion 72 by taking a diagonal line 73 of the flexible substrate as a boundary. The data lines located at the upper left half of the flexible substrate are the first portion and the data lines located at the lower right half of the flexible substrate are the second portion.

Among the data lines included in the first portion 71, when viewed from top to bottom, the number of thin film transistors connected to one preceding data line 2 is less than the number of thin film transistors connected to one following data line 2. Among the data lines included in the second portion 72, when viewed from top to bottom, the number of thin film transistors connected to one preceding data line 2 is more than the number of thin film transistors connected to one following data line 2.

That is to say, in the arrangement direction of data lines, the numbers of transistors connected to the data lines are increased firstly and then decreased.

Optionally, in the arrangement direction of data lines, the numbers of transistors connected to the data lines firstly are increased as an arithmetic progression with a common difference of P1, and then are decreased as an arithmetic progression with a common difference of P2.

Further, the common differences P1 and P2 are equal, i.e., the numbers of transistors connected to the data lines are symmetrical relative to the diagonal line. For example, P1=P2=2.

Assuming that there are 2m data lines, the numbers of transistors subsequently connected to the data lines in the arrangement direction of the data lines are 1, 3, 5 . . . 2n−3, 2n−1, 2n−1, 2n−3 . . . 5, 3, 1 (1≤n≤m, n, m are positive integers). Then, corresponding data driving signals according to one embodiment of the present disclosure are shown in FIG. 11.

Figure 11:
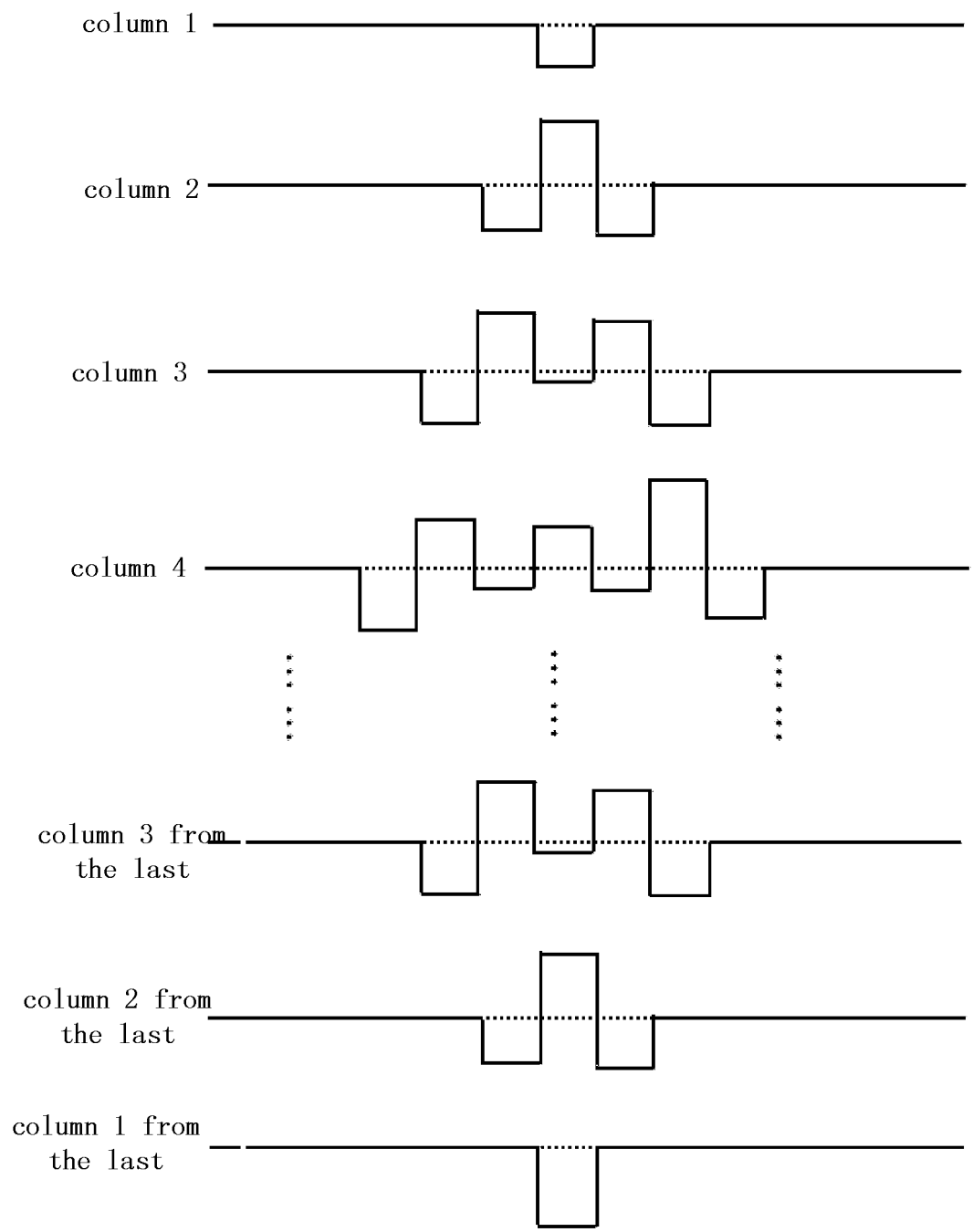
FIG. 11 is a schematic timing diagram of data driving signals according to one embodiment of the present disclosure.

From FIG. 11, it can be found that, in the arrangement direction of the data lines, the numbers of sub-signals included in the driving signals transmitted by the driving unit increase firstly and then decreases.

In one embodiment of the present disclosure, for a rectangular flexible substrate, the above-mentioned data lines and the gate lines are perpendicular to each other. The arrangement that the data lines and the gate lines are oblique to the side of the flexible substrate may help to improve the bending properties of substrates, which will be described below.

The angular relationship and comparison relationship of lengths, numbers between lines mentioned in one embodiment of the present disclosure are all to be described with an example of being in the display region.

Bending of the obliquely arranged signal transmission lines according to one embodiment of the present disclosure will be described below.

Figure 8:
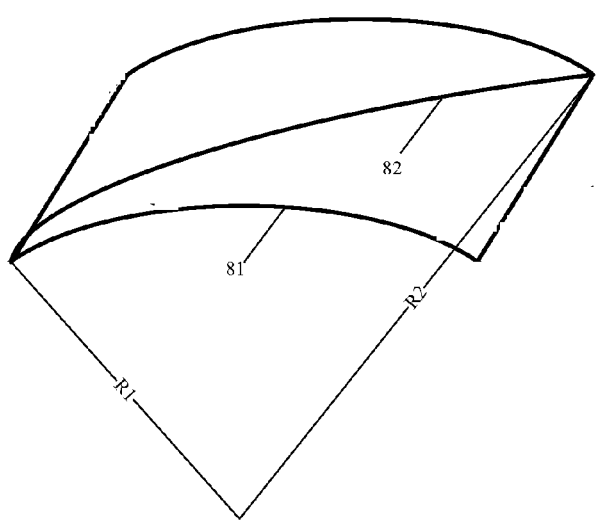
FIG. 8 is a schematic diagram showing comparison of effects of an array substrate according to one embodiment of the present disclosure and the array substrate in the related art.

As shown in FIG. 8, it is assumed that in FIG. 8, 81 represents a first signal transmission line arranged perpendicular to one side of the flexible substrate in the related art, while 82 represents a second signal transmission line arranged obliquely to one side of the flexible substrate according to one embodiment of the present disclosure. It may be found from the figure that, since a length of the second signal transmission line 82 is larger than a length of the first signal transmission line 81, thus when the substrate is bent as shown in FIG. 8, the second signal transmission line 82 has a radius of curvature R2 greater than a radius of curvature R1 of the first signal transmission line 81, that is, the flexure degree of the second signal transmission line 82 is less than the flexure degree of the first signal transmission line 81.

In accordance with geometric principles, if an angle between the second signal transmission line 82 and one side of the flexible substrate is 45°, the radius of curvature of the second signal transmission line 82 is about 1.4 times of the radius of curvature of the first signal transmission line 81.

Therefore, in one embodiment of the present disclosure, by arranging the signal transmission line obliquely to one side of the flexible substrate, the flexure degree of the signal transmission line is decreased when the substrate is bent, so as to improve the bending properties of substrates.

Of course, one embodiment of the present disclosure is described with taking that the second signal transmission line has the same material and function as the first signal transmission line in the related art (e.g., both being as a data line) as an example, but not limited thereto.

In one embodiment of the present disclosure, the flexible substrate may be divided into a flexible display region and an inflexible peripheral region. The driving unit is provided in the peripheral region.

Since the strength of the peripheral region is large, thus, the peripheral region is less likely to be bent relative to the display region, and the arrangement of the driving unit in the peripheral region may improve the protection for the driving unit.

In one embodiment of the present disclosure, there may be one driving unit, and also may be two or more. With taking that there are two driving units included as an example, the two driving units are provided correspondingly on two opposite sides of the flexible substrate and connected to the data lines and the gate lines based on the principle of connection to the nearest.

Figure 9:
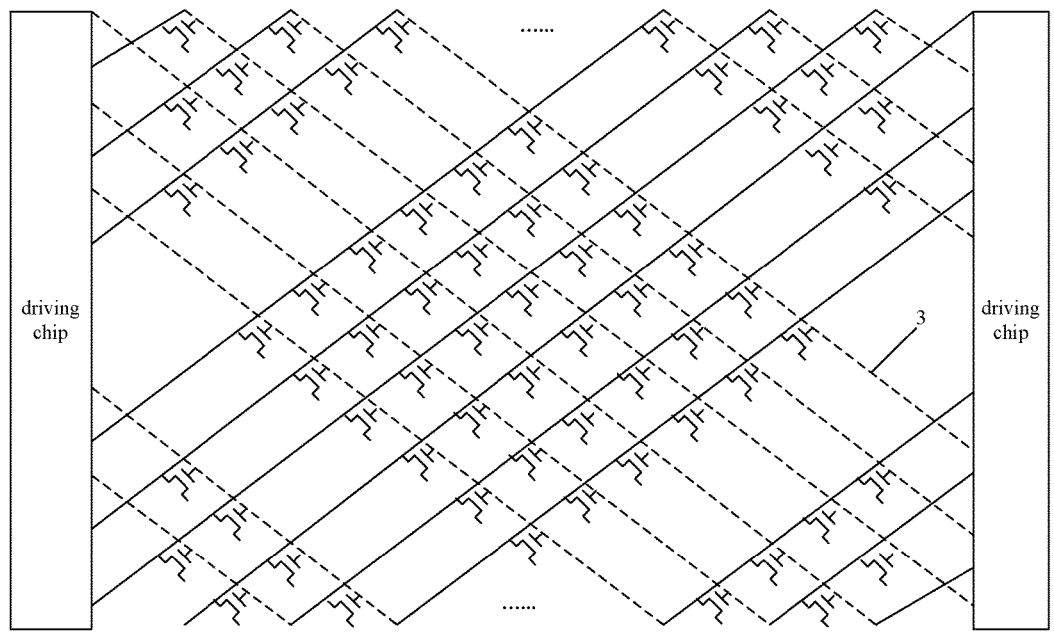
FIG. 9 is a schematic diagram showing a structure of an array substrate provided with two driving units according to one embodiment of the present disclosure.

The array substrate with two driving unit is as shown in FIG. 9. It can be found that, the two driving units are connected to the data lines and the gate lines based on the principle of connection to the nearest.

In the above embodiment, the aforementioned driving unit may simultaneously drive data lines and gate lines. However, it should be understood that the driving unit of one embodiment of the present disclosure may also include a data driving unit configured to separately drive data lines and a gate driving unit configured to separately drive gate lines. The gate driving unit may be a chip provided independently, and also may be integrated with the array substrate by GOA (Gate on Array).

The principle of connection to the nearest will be described below with the data line 2 and the gate line 3 in FIG. 10.

Figure 10:
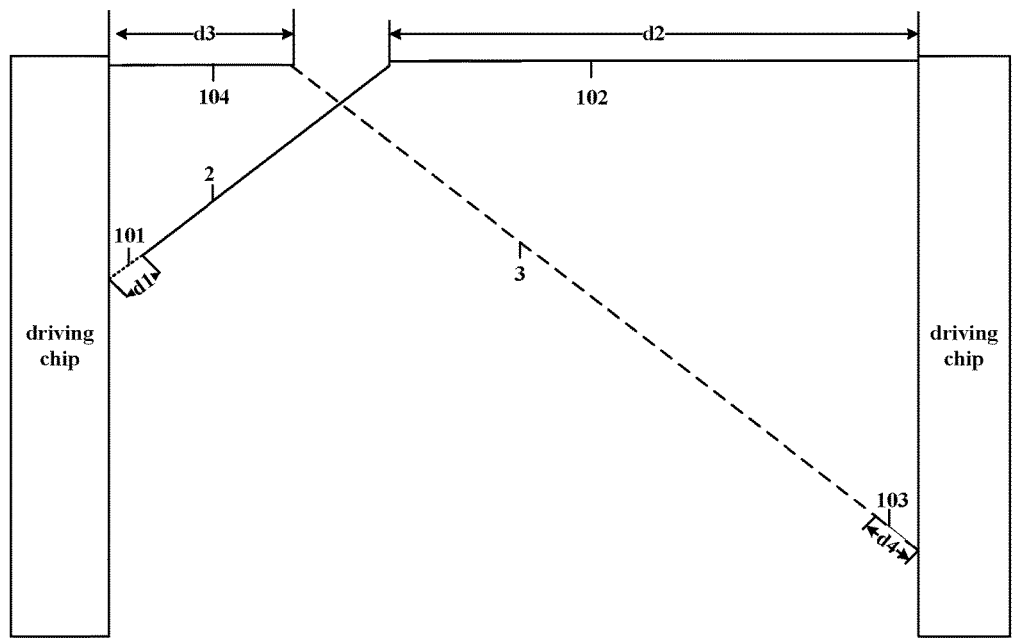
FIG. 10 is a schematic diagram showing connections to the nearest when an array substrate is provided with two driving units according to one embodiment of the present disclosure.

As shown in FIG. 10, the data line 2 may be connected to a left driving unit via a first connection line 101, and may also be connected to a right driving unit via a second connection line 102. However, apparently, a length d1 of the first connection line 101 is less than a length d2 of the second connecting line 102. Therefore, in accordance with the principle of connection to the nearest, the data line 2 in FIG. 10 is driven by the left driving unit.

As shown in FIG. 10, the gate line 3 may be connected to the right driving unit via a third connection line 103, and may also be connected to the left driving unit via a fourth connection line 104. However, apparently, a length d3 of the third connection line is less than a length d4 of the fourth connecting line 104. Therefore, in accordance with the principle of connection to the nearest, the gate line 3 in FIG. 10 is driven by the right driving unit.

That is, with respect to any signal transmission line, in accordance with the principle of connection to the nearest, a connection distance from the signal transmission line to the driving unit which is connected currently, will be less than or equal to the minimum connection distance from the signal transmission line to another driving unit.

As shown in FIG. 9 and FIG. 10, such connection greatly reduces length differences of the connection lines between different signal transmission lines and the driving units, and this may reduce transmission delay of the signals transmitted to different signal transmission lines by the driving units and improve the system performance.

In order to better achieve the above object, one embodiment of the present disclosure also provides a flexible display device, including any of the above array substrates.

The structure and the working principle of the array substrate are similar to the above-described embodiments and will not be repeated here. In addition, structures of other parts of the flexible display device may refer to the related art, and will not be described in detail herein. The flexible display device may be an LCD panel, an electronic paper, an LCD TV, an LCD monitor, a digital photo frame, a mobile phone, a tablet PC and any other products or parts with displaying functions.

In order to better achieve the above object, one embodiment of the present disclosure also provides an electronic equipment, including the above-described flexible display device.

In order to better achieve the above object, one embodiment of the present disclosure also provides a method for driving the above-described array substrate, used for the driving unit. The driving method includes:

generating, by the driving unit, a data driving signal corresponding to a first data line;

outputting, by the driving unit, the data driving signal to the first data line;

the number of sub-signals in the data driving signal being equal to the number of thin film transistors connected to the first data line.

As shown in FIG. 7, the data lines are divided into a first portion and a second portion in the arrangement direction of the data lines. In the arrangement direction of the data lines, among the data lines in the first portion, the number of thin film transistors connected to one preceding data lines is less than the number of thin film transistors connected to one following data line; and among the data lines in the second portion, the number of thin film transistors connected to one preceding data line is larger than the number of thin film transistors connected to one following data line. The data driving signals are also divided into two portions. Among the driving signals corresponding to the data lines in the first portion, the number of sub-signals in one driving signal corresponding to one preceding data line is less than the number of sub-signals in one driving signal corresponding to one following data line; and among the driving signals corresponding to the data lines in the second portion, the number of sub-signals in one driving signal corresponding to one preceding data line is more than the number of sub-signals in one driving signal corresponding to one following data line.

In other words, in timing sequence relationship, the numbers of sub-signals of the data driving signals are increased firstly and then decreased.

The above are only optional embodiments of the present disclosure. It should be noted that a number of improvements and modifications may be made without departing from the principles of the present disclosure for those of ordinary skill in the art, and should be considered to fall within the protection scope of the present disclosure.

What is claimed is:

1. An array substrate, comprising a flexible substrate and an array layer formed on the flexible substrate; wherein the array layer comprises:
   a plurality of data lines and a plurality of gate lines, intersected with each other on the flexible substrate to form a plurality of sub-pixel regions;
   thin film transistors, provided in the sub-pixel regions and connected to corresponding data lines and corresponding gate lines;
   the array substrate further comprises:
      a driving unit, configured to output data driving signals to connected data lines;
   wherein the data driving signals include sub-signals output by the driving unit to data lines,
   wherein the plurality of data lines comprise a first data line connected to thin film transistors of a first number and a second data line connected to thin film transistors of a second number; the number of sub-signals in a data driving signal outputted to the first data line by the driving unit within a time period of one frame is the first number; the number of sub-signals in a data driving signal outputted to the second data line by the driving unit within a time period of one frame is the second number,
   wherein the number of sub-signals is determined by the driving unit according to the numbers of thin film transistors connected to the data lines, and
   wherein the flexible substrate is of a rectangular shape.

2. The array substrate according to claim 1, wherein the data lines are arranged in parallel, and an angle between any one of the data lines and any side of the flexible substrate is not equal to 90°.

3. The array substrate according to claim 2, wherein the gate lines and the data lines are perpendicular to each other.

4. The array substrate according to claim 3, wherein an angle between the data line and one side of the flexible substrate is in a range of 30° to 60°.

5. The array substrate according to claim 4, wherein the angle between the data line and one side of the flexible substrate is 45°.

6. The array substrate according to claim 5, wherein
   in an arrangement direction of the data lines, the data lines are divided into two portions;
   in the arrangement direction of the data lines, among the data lines in one portion, the number of thin film transistors connected to one preceding data line is less than the number of thin film transistors connected to one following data line; among the data lines in other one portion, the number of thin film transistors connected to one preceding data line is larger than the number of thin film transistors connected to one following data line.

7. The array substrate according to claim 6, wherein, among the data lines in the one portion, the numbers of thin film transistors connected to the data lines are increased with a first common difference; among the data lines in the other one portion, the numbers of thin film transistors connected to the data lines are decreased with a second common difference.

8. The array substrate according to claim 7, wherein the first common difference is equal to the second common difference.

9. The array substrate according to claim 1, wherein the flexible substrate is divided into a flexible display region and an inflexible peripheral region, and the driving unit is in the peripheral region.

10. The array substrate according to claim 1, wherein the driving unit comprises a first driving unit and a second driving unit provided correspondingly on two opposite sides of the flexible substrate; the first driving unit and the second driving unit are connected to the data lines and the gate lines based on a principle of connection to the nearest.

11. The array substrate according to claim 10, wherein each of the first driving unit and the second driving unit comprises a data driving unit configured to separately drive the data lines and a gate driving unit configured to separately drive gate lines.

12. A flexible display device, comprising the array substrate according to claim 1.

13. An electronic equipment, comprising the flexible display device according to claim 12.

14. A method for driving the array substrate according to claim 1, used for a driving unit, wherein the method comprises:

generating, by the driving unit, a data driving signal corresponding to a first data line;

outputting, by the driving unit, the data driving signal to the first data line;

wherein the number of sub-signals in the data driving signal outputted to the first data line by the driving unit within a time period of one frame is equal to the number of thin film transistors connected to the first data line.

15. The method for driving the array substrate according to claim 14, wherein in an arrangement direction of the data lines, the data lines are divided into a first portion and a second portion; in the arrangement direction of the data lines, among the data lines in the first portion, the number of thin film transistors connected to one preceding data line is less than the number of thin film transistors connected to one following data line; and among the data lines in the second portion, the number of thin film transistors connected to one preceding data line is larger than the number of thin film transistors connected to one following data line; the data driving signals are divided into two portions; in the driving signals corresponding to the data lines in the first portion, the number of sub-signals in one driving signal corresponding to one preceding data line is less than the number of sub-signals in one driving signal corresponding to one following data line; and in the driving signals corresponding to the data lines in the second portion, the number of sub-signals in one driving signal corresponding to one preceding data line is larger than the number of sub-signals in one driving signal corresponding to one following data line.

16. The array substrate according to claim 2, wherein
in an arrangement direction of the data lines, the data lines are divided into two portions;
in the arrangement direction of the data lines, among the data lines in one portion, the number of thin film transistors connected to one preceding data line is less than the number of thin film transistors connected to one following data line; among the data lines in other one portion, the number of thin film transistors connected to one preceding data line is larger than the number of thin film transistors connected to one following data line.

17. The array substrate according to claim 3, wherein
in an arrangement direction of the data lines, the data lines are divided into two portions;
in the arrangement direction of the data lines, among the data lines in one portion, the number of thin film transistors connected to one preceding data line is less than the number of thin film transistors connected to one following data line; among the data lines in other one portion, the number of thin film transistors connected to one preceding data line is larger than the number of thin film transistors connected to one following data line.

18. The array substrate according to claim 4, wherein
in an arrangement direction of the data lines, the data lines are divided into two portions;
in the arrangement direction of the data lines, among the data lines in one portion, the number of thin film transistors connected to one preceding data line is less than the number of thin film transistors connected to one following data line; among the data lines in other one portion, the number of thin film transistors connected to one preceding data line is larger than the number of thin film transistors connected to one following data line.

* * * * *